Dec. 24, 1940.   N. B. LUND   2,225,836
LIQUID DISTRIBUTOR
Filed April 8, 1938    4 Sheets-Sheet 1
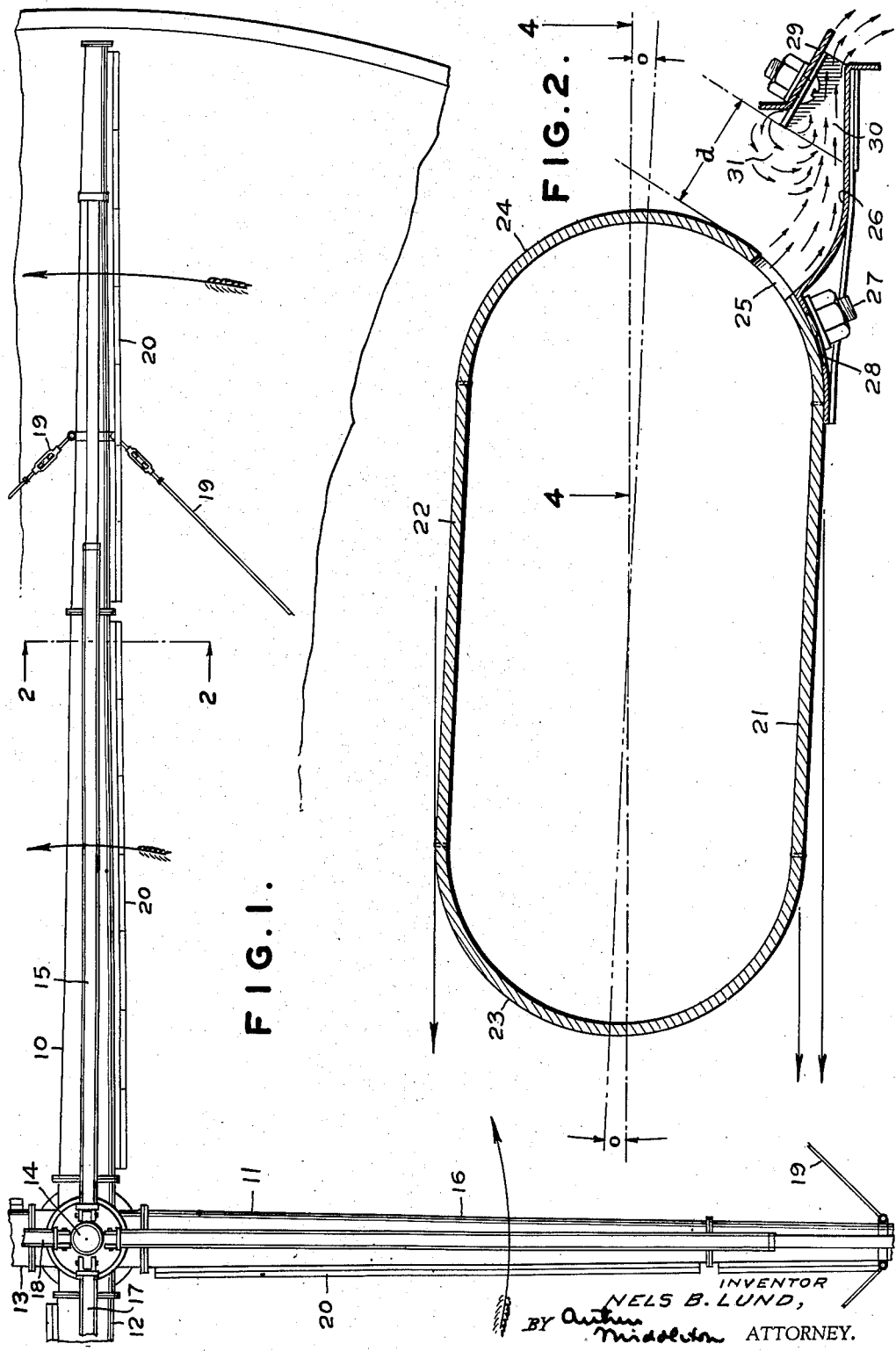
INVENTOR
NELS B. LUND,
BY Arthur Middleton ATTORNEY.

Dec. 24, 1940.　　　　N. B. LUND　　　　2,225,836
LIQUID DISTRIBUTOR
Filed April 8, 1938　　　4 Sheets-Sheet 2
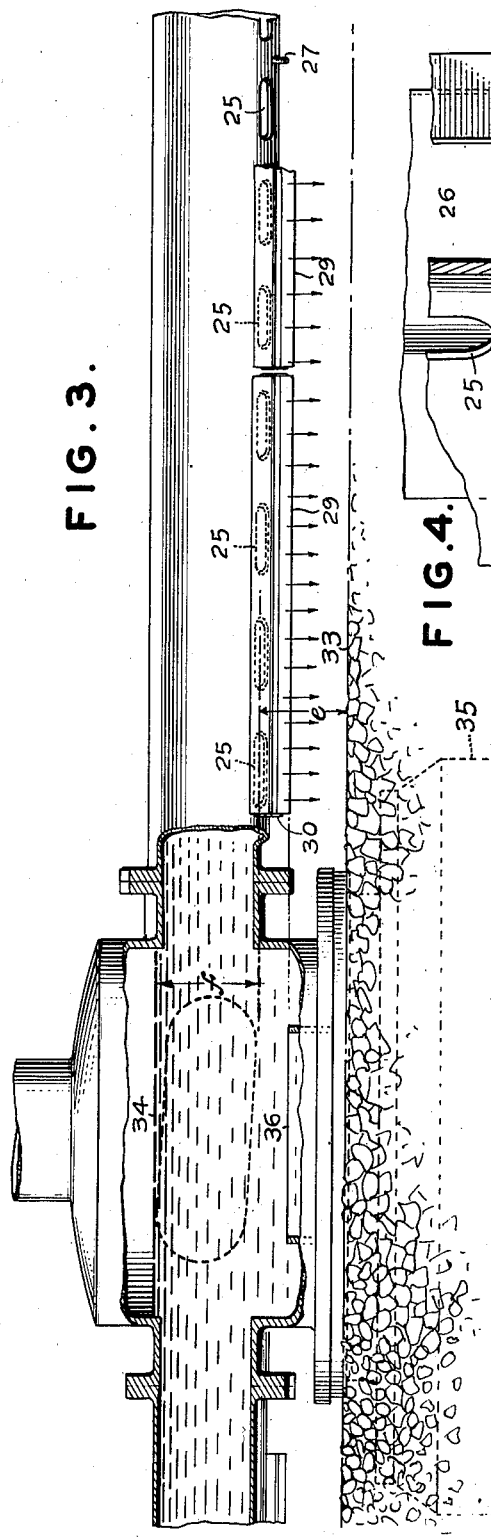
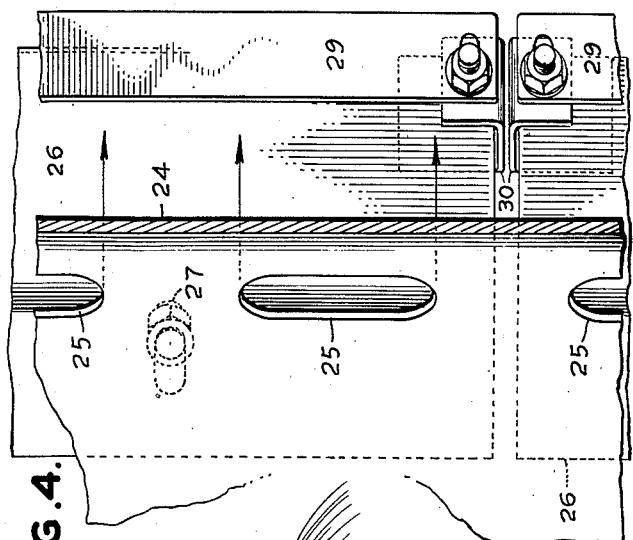
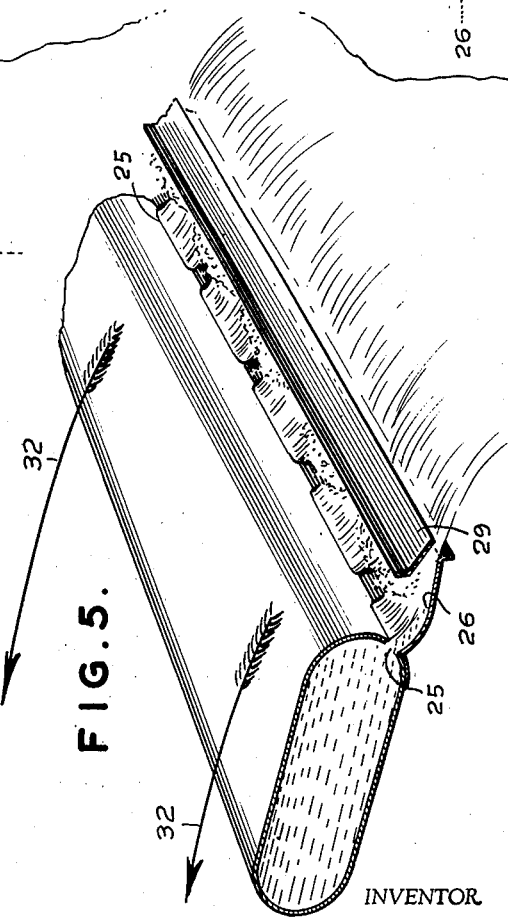
INVENTOR
NELS B. LUND,
BY
ATTORNEY.

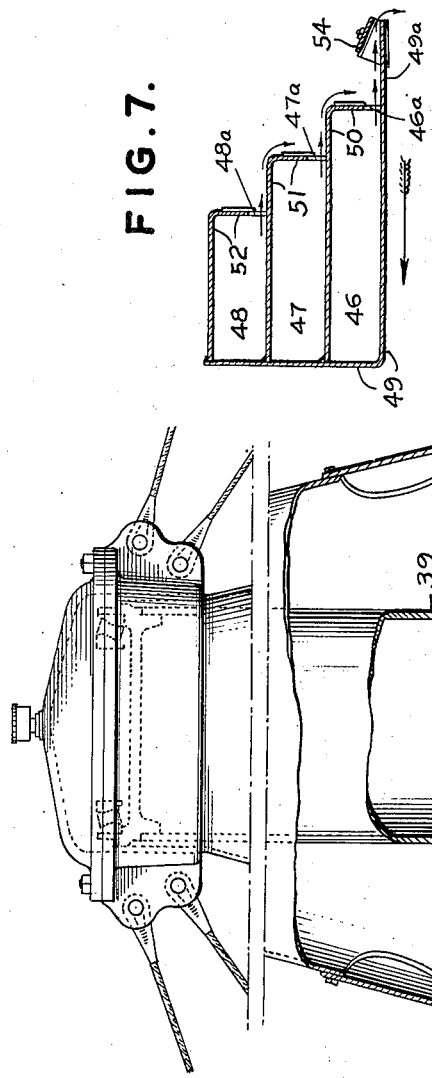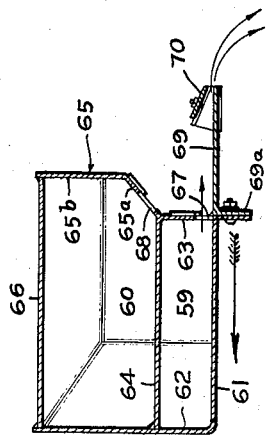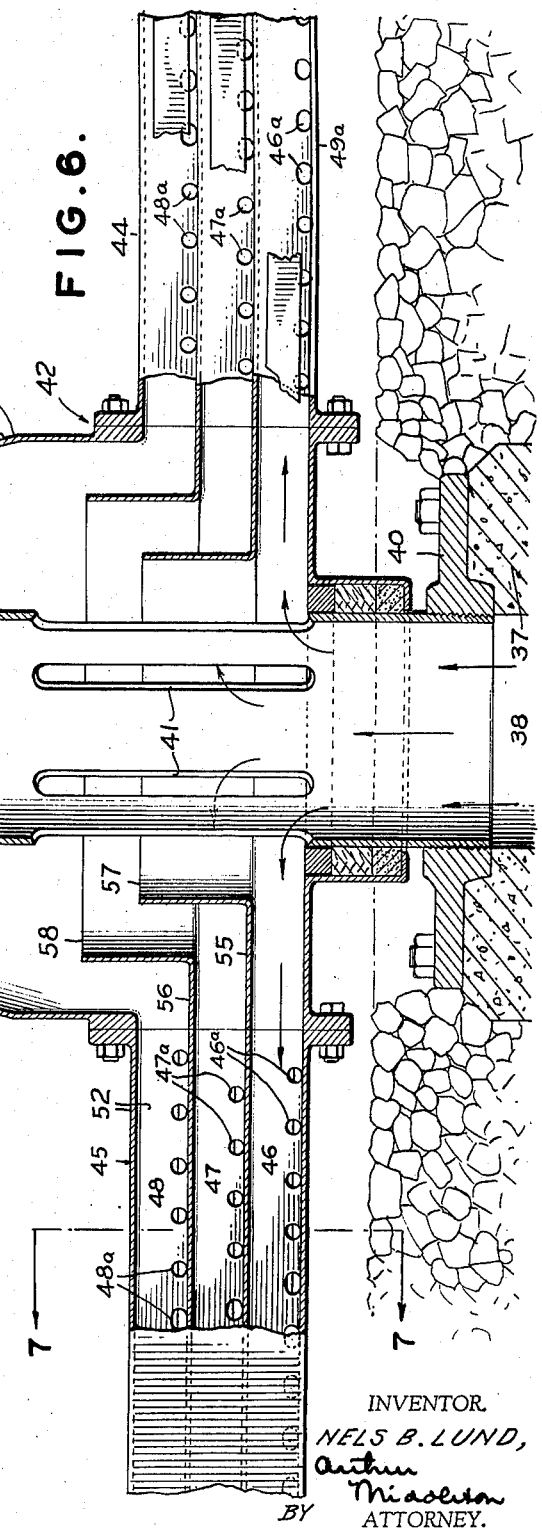

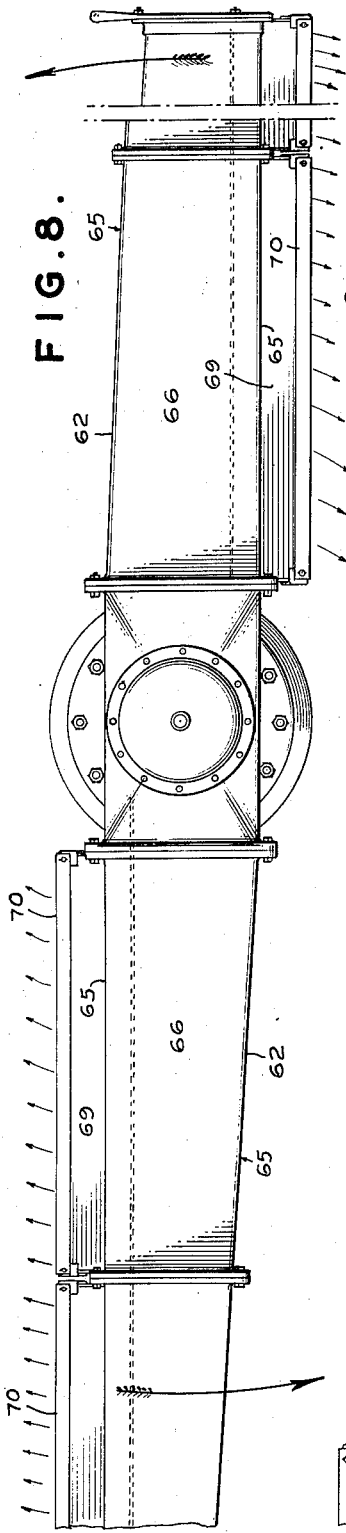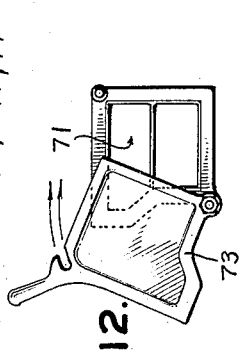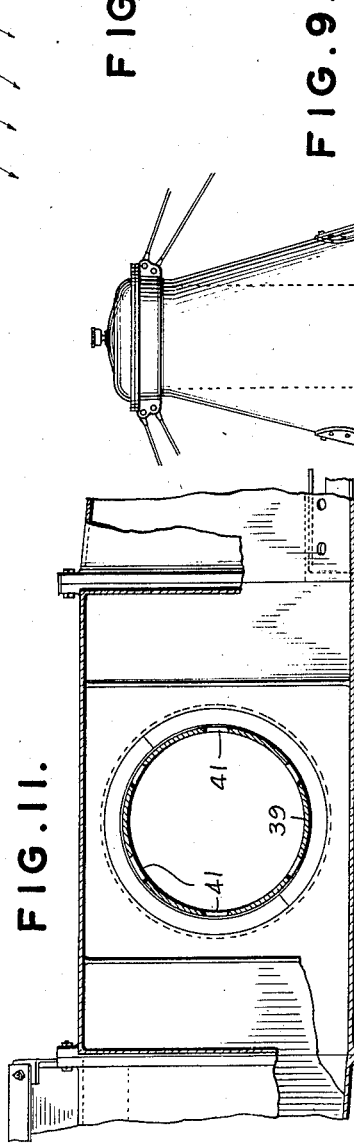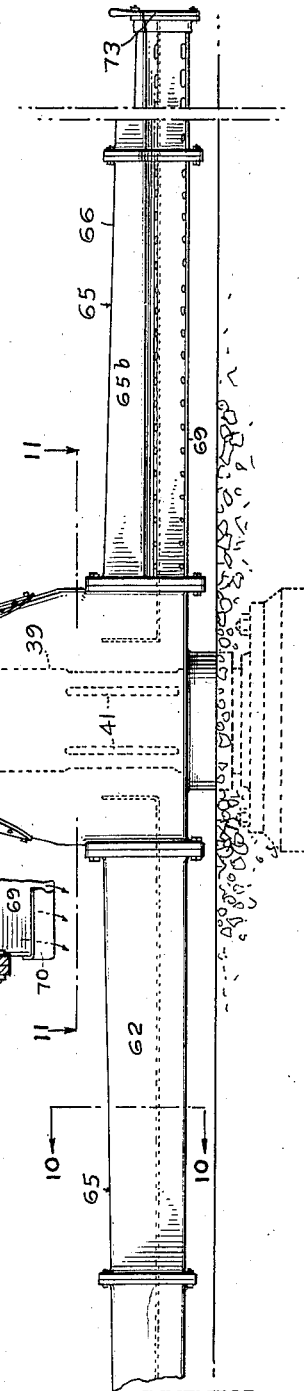

Patented Dec. 24, 1940

2,225,836

UNITED STATES PATENT OFFICE 2,225,836

LIQUID DISTRIBUTOR

Nels B. Lund, Seaford, N. Y., assignor to The Dorr Company, Inc., New York, N. Y., a corporation of Delaware Application April 8, 1938, Serial No. 200,940

2 Claims. (Cl. 299—69)

This invention relates to distributors or disseminating device for spraying liquids such as sewage onto filter beds or the like.

More particularly it relates to the rotary type of distributor having radial distributing or spray arms and in a specific sense it contemplates improvements in the hydraulically-operated type of machine wherein rotation of the spray arms is produced by the hydraulic reaction of the liquid emitted from orifices laterally along the radial arms or spray pipes carried by a suitable rotative supporting structure.

One object of this invention is the design of a liquid distributor that will require a relative minimum of hydraulic head for its operation and a relative minimum of vertical space to function with respect to the underlying filter bed.

Other objects are to provide an improved rotative distributor of sturdy, compact, well balanced and light-weight construction which is simple in its structural elements and economical to build.

Another object is to provide a liquid distributing device with an improved construction and arrangement of radial spray arms or pipes that are economic and simple to build and highly efficient in operation, and of particular advantage in the handling and distributing onto the filter bed of relatively high rates of liquid flow.

Another object is to provide spray arms or pipes for liquid distributors constructed and arranged to permit ready and substantially complete drainage of liquid from the arms.

A further object is the design of distributing arms that will handle relatively large flows of liquid while distributing the same uniformly and with a minimum of hydraulic head requirement over and onto the filter bed.

Another object is to design a distributor in which the total weight of the arms plus the water load therein is a minimum, so that the device will readily respond to hydraulic reaction.

Still another object is to design a distributor which is flexible in operation within relatively wide load limits, that is to say which will operate under desirable and proper hydraulic flow conditions over a relatively wide range of varying loads at minimum respective heads.

In view of these objects, the features of improvement within the scope of this invention are largely found in the construction, design, and in the peculiar improved functioning of the radial distributor arms.

Consequently, according to one feature a hollow distributor arm is of horizontally-flattened or horizontally-elongated cross-section, and a horizontally spreading sheet-like stream of the liquid discharges along the length thereof and substantially from the lowest point of the cross-section, so that consequently there is needed but relatively low hydraulic head for the proper hydraulic functioning of the distributor arm.

According to another feature, a sheet-like stream of discharging liquid is realized by providing a series of suitably shaped discharge openings or orifices along the length of the arm in conjunction with a discharge lip extending substantially or in effect tangentially from the lower side of the arm.

Other features have to do with the use of certain liquid spray spreaders in conjunction with the distributor arms.

According to one such feature an improved distributor arm according to the invention is provided with a nozzle-like discharge portion of a construction whereby there is realized a horizontally flattened sheet-like stream of discharging liquid, which nozzle portion comprises opposedly arranged cooperative upper and lower lip portions, of which the upper one may be called a doctor strip and is spaced from the adjacent wall portion of the distributor arm in a manner to permit convenient access from above to the orifices and also to the interior of the nozzle portion.

Other features have to do with structural design and manufacturing characteristics of a distributor arm designed to meet certain requirements of hydraulic flow and of liquid distribution. Some such features are that the arm is composed of relatively simple plane sheet metal wall portions, that the arm is a welded longitudinal box-shape, and that the arm has a flattened flow cross-section diminishing continually from a maximum cross-section of its inner end portion to a minimum at the outer end.

The invention possesses other objects and features of advantage, some of which with the foregoing will be set forth in the following description. In the following description and in the claims, parts will be identified by specific names for convenience, but they are intended to be as generic in their application to similar parts as the art will permit. In the accompanying drawings there has been illustrated the best embodiment of the invention known to me, but such embodiment is to be regarded as typical only of many possible embodiments, and the invention is not to be limited thereto.

The novel features considered characteristic of my invention are set forth with particularity in the appended claims. The invention itself, however, both as to its organization and its method of operation, together with additional objects and advantages thereof, will best be understood from the following description of a specific embodiment when read in connection with the accompanying drawings, in which:

Fig. 1. is a semi-diagrammatic plan view of a rotary reaction driven distributor indicating some of applicant's improvements.

Fig. 2 is an enlarged showing of a horizontally flattened cross sectional shape of a distributor arm with means to form an uninterrupted sheet-like spray extending along the arm, as shown in Figs. 3 to 5.

Fig. 3 is a part-sectional, somewhat enlarged side view of a distributor such as shown in Fig. 2.

Fig. 4 is an enlarged detailed plan view of the spray orifices and of the spray forming means shown in Fig. 2.

Fig. 5 is a perspective view of a portion of a distributor arm showing the functioning of the spray orifices and of the spray forming means which include a doctor strip.

Fig. 6 is a modification of the distributor in which the arms are subdivided into a plurality of longitudinal flow sections superposed one upon the other.

Fig. 7 is a cross-section of the distributor arm of Fig. 6.

Fig. 8 is the plan view of a two-arm rotary distributor, each arm of which has a lower flow section and an overhanging upper flow section.

Fig. 9 is a side view of Fig. 8.

Fig. 10 is an enlarged cross-section of the distributor arm of Fig. 8 or 9 respectively.

Fig. 11 is an enlarged part-sectional plan view of the center portion of the distributor shown in Figs. 8 and 9 respectively.

Fig. 12 is an end view of a distributor arm of Figs. 8 and 9 respectively with end closure means.

According to Figs. 1–4 some of the features of this invention are shown to be embodied in a liquid distributor in which a reaction driven rotor is shown to comprise, for example, the conventional number of four spray arms 10, 11, 12, 13 (see semi-diagrammatic Fig. 1) extending and supported from a hub portion or column 14. There are shown guy connections 15, 16, 17, 18 for bracing the arms from the column, and also horizontally extending bracing connections 19 between respective neighboring arms.

In diagrammatic fashion there are further shown in Fig. 1 spray forming strips or liquid spreaders 20 which serve to direct a series of liquid sprays substantially horizontally and directly away from the arm, and under conditions intended to set up in the arm a relative maximum of reactive driving power although under a relative minimum of pressure head necessary for the operation.

Fig. 2 is an enlarged cross sectional detailed view of the distributor arm of Fig. 1, and it discloses a peculiar horizontally flattened cross sectional flow area of the arm and is shown, for example, to be composed of a substantially flat or plane bottom portion 21, and similar plane top portion 22, a leading side wall portion 23, and a trailing side wall portion 24. Liquid discharge orifices 25 are provided and disposed in the trailing side wall portion 24 at or near the flat bottom portion 21, that is to say, at or near the lowest point of the cross-sectional flow area of the arm. It is also noted that the trailing side portion of the arm is slightly lower than the leading side portion thereof, to permit drainage as far as possible from the entire flow cross section. Rapid and complete drainage is desired to prevent unequal water loads to remain in the arms when the machine is at a stand still, and thereby to prevent unbalancing of the arms.

A spreader strip or element 26 for the discharging liquid is shown to be fastened to the distributor arm as by means of bolt and nut connections 27, the bolt extending through a slot 28 in the spreader element, to permit adjustment thereof relative to the orifices. A spray confining or spray shaping doctor strip 29 is spaced from the trailing side wall portion 24 as indicated by the distance "d" and is shown to be mounted upon and in converging relation to the spreader strip 26 by way of bracket members 30. From Fig. 2 it is also seen (and illustrated by arrows 31) that the doctor strip 29 acts to subdue irregularities or swirls incident to the issuance of the individual discharging streams from the orifices, in order to produce a substantially even, uninterrupted and efficient application of the spray to the filter material 33. (See Fig. 3.) For the proper operation hydraulically of the distributor there is further required a hydraulic head above the orifice of the liquid spreader, which is equal to the distance "f" (see Fig. 3) defining a minimum operative liquid lever 34 within the distributor. A distance "e" between the orifice and the surface of the filter bed plus the distance "f" thus indicate the approximate hydraulic head required above the filter bed for the operation of the distributor.

Figure 3 is a part-sectional somewhat enlarged side view of the distributor shown in Figure 1, mounted upon a foundation 35, and having a feed inlet from below at 36.

In the detail perspective view of Fig. 5 arrow 32 indicates the direction of reactive driving force upon a distributor arm. The sectional enlarged detail plan view of Fig. 4 shows more clearly the location and shape of the orifices.

In Figs. 6–12 other features of this invention are illustrated in a distributor in which each arm has a plurality of longitudinal flow sections which are superposed upon one another, and which become successively filled and effective in discharging and spreading increasing amounts of liquid due to a corresponding rise in the level of the liquid supply.

The distributor shown in Fig. 6 is mounted upon a foundation 37 having a central rising feed conduit 38, and it comprises a stationary hollow column 39 mounted and fixed upon the foundation 37 by way of a base member 40 and having vertically extending feed inlet slots 41 of a height sufficient for the purpose hereinafter described.

Mounted for rotation upon and supported by the stationary hollow column 39 is the rotary part or rotor 42 of the distributor, comprising the central hollow or hub portion 43 which has functionally connected therewith or bolted thereto a pair of symmetrically arranged horizontally extending distributor arms 44 and 45. As one embodiment each of these distributor arms is shown to have three longitudinally extending flow sections 46, 47, 48 (see also Fig. 7) superposed one upon the other, each section being shown as of substantially horizontally flattened rectangular cross section. Consequently the distributor arm in this embodiment is shown to be composed and preferably welded from flat sheet metal sections, such flat sections being particularly adapted from a manufacturing point of view to constitute an arm of outwardly continually decreasing cross-sectional flow area.

According to Fig. 7 these flat sheet metal component sections comprise an angular main body portion or profile 49 which has welded to it a smaller angular profile 50 to constitute the lowermost longitudinal flow section 46. Over this is welded a relatively smaller angular profile 51 defining the next higher longitudinal flow section 47. This is topped by a still smaller welded connected angular profile 52 defining the third or topmost longitudinal flow section 48.

Each of the flow sections 46, 47, 48 has its series of liquid discharge orifices 46a, 47a, 48a, near the bottom, and at the trailing side of the arm, and a protruding end portion of the horizontal shank of the main angular profile 49 constitutes a spreader portion 49a, for the liquid that discharges from the respective orifices 46a, 47a, 48a. This spreader portion is shown to carry what may be called a doctor strip 54 similar in effect and construction to the one described in connection with Figs. 2, 4, and 5.

In Figure 6 the longitudinal flow sections 46, 47, 48 can be said to be defined by horizontally extending longitudinal divisional walls or partitions 55 and 56. The lower partition 55 has a relatively lower weir portion 57 and the upper partition 56 a relatively higher weir portion 58. Both weir portions in this embodiment are substantially concentric and annular. The liquid entering through the central column 39 and through the feed slots 41 will first enter and fill the lower longitudinal flow section 46 and will discharge through the respective orifices therein. A further rise of the liquid head in the distributor will cause the weir portions 57 and 58 respectively to become flooded and consequently this will set the additional flow sections 47 and 48 to function to discharge liquid through their respective orifices and under the respective hydraulic pressures determined by the height of the respective highest weir. A modified type of cross section of a distributor arm with longitudinal flow sections is shown in Fig. 10. As in Fig. 7 this modified type is of a boxlike construction comprising a horizontally flattened or rectangular lower flow section 59 and an upper flow section 60 partly overhanging the lower flow section at the trailing side thereof. Again this arm is composed of plane sheet metal sections, it comprising the bottom portion 61 from the leading side of which rises a vertical wall portion 62 and shown to be bent from one piece with the portion 61. The bottom portion and the wall portion together thus constituting the main body portion of the arm, there is built up the lower flow section 59 by vertical wall portion 63 at the trailing side of the arm and a horizontally extending divisional wall portion 64 incidentally also shown to be bent from one piece with the vertical wall portion 63. An overhanging wall portion 65, comprising an upwardly inclined portion 65a and a vertical portion 65b, and a horizontally extending top wall portion 66 complete the upper flow section 60. The lower flow section has a series of longitudinally spaced orifices 67 disposed at or near the bottom portion thereof, orifices 68 being provided in the overhanging wall portion 65a of the upper flow section of the arm. The bottom portion 61 of the arm has a trailing shelf-like continuation to serve as liquid spreader 69 for the streams issuing from the upper as well as from the lower orifices, and it has a flange connection 69a with the bottom portion 61 of the arm. Upon this spreader 69 is mounted a spray shaping doctor strip 70 similar to the one shown in Figs. 4, 5 and 7. The cross section of the arm shown in Fig. 10 has a proportionately smaller, although homologous end opening or end cross section 71 as shown in Fig. 12 provided with a closure piece 73.

Keeping in mind that one of the controlling view points in the present construction is to operate the distributor at a minimum hydraulic head counting upwardly from the top level of the filter bed, it will be noted (see Fig. 3) that this head includes the distance $e$ from the discharging orifice to the filter surface indicated by the numeral 33, which distance $e$ should be just enough to permit of adequate application of the spray from the spreader to the filter material. Inasmuch as the sprays issue from the lowest point of the cross sectional flow area of the arm, there is no loss of hydraulic head except for frictional losses or the like in the arm, and consequently an additional portion of the head (see Fig. 3) will define an approximate minimum liquid level elevation needed for the proper hydraulic functioning of the arm and the operation of the distributor. It will be noted that this portion $f$ of the head is kept at a minimum due to the flattened shape of the arm, although it will also be seen that nevertheless a fair maximum of reactive force upon the arm is derived from the sprays at such minimum head due to their issuance horizontally and directly at right angles away from the arm.

The basic form of the distributor arm itself is characterized by a continually decreasing cross sectional flow area designed in a preferred embodiment to establish substantially uniform flow velocity in the arm, which decrease of flow area again is realized by the continuity of the tapering shape of the arm. Otherwise expressed this means that there is no unnecessary dead water load being carried by the arm and consequently no unnecessary dead material weight, that might undesirably increase the total operating weight of the arm. Another advantage of such a continuous tapering configuration is that there is no hydraulic head loss of the type that would accrue from a more sudden change from a larger to a smaller cross sectional flow area.

Structurally the tapering volume of the arm is realized by establishing what might be called a basically box shaped form of the arm, and composing it of plane sheet metal sections to constitute the structural elements, and which elements may be suitably joined together by welding. Sheet metal thus constituting the starting material in the construction of the arm, readily lends itself to being cut to the proper desired plane or angular shapes and these component shapes or potential wall portions of the arm can be chosen to be of a minimum desirable and commercially obtainable sheet metal thickness or gauge number, and they can be welded together so that the resulting arm structure will be of minimum weight of itself, will require a minimum of dead water load, will operate at a minimum head required and with minimum losses of a certain kind, and due to its minimum total operating weight it will readily respond to the hydraulic driving impulses available.

Division having been required in this case, subject matter originally submitted in the present case is covered in a divisional application Serial No. 273,290, filed May 12, 1939 and in an application Serial No. 328,140, filed April 15, 1940.

I claim:

1. A liquid distributor of the rotary reaction driven type, comprising a traveling liquid conducting distributing arm having a series of longitudinally spaced orifices provided in a side wall portion at the trailing side thereof, a spray forming and sustaining strip extending substantially horizontally from and along said arm and associated with said orifices to be effective to form streams from said orifices into a sheet-like substantially uninterrupted stream, and a doctor strip spaced from said trailing side wall portion and associated with said spray sustaining strip in spaced relationship thereto.

2. A liquid distributor of rotary reaction driven type comprising a traveling liquid conducting distributing arm of horizontally flattened cross-section and comprising substantially plane top and bottom portions and substantially convexly rounded leading and trailing portions, said arm having a series of longitudinally spaced discharge orifices arranged along the trailing side of the arm and disposed in the lower half of the arm although in the convex portion thereof and substantially close to the bottom and from where the liquid is emitted in a downwardly oblique direction; and a spray guiding spray rectifying lip associated with the lower marginal portion of said orifices and extending along a length of the arm and attachable thereto, said lip having a concave liquid guiding surface portion near the orifice and a continuing plane portion substantially merging therewith, and extending substantially in a plane with the bottom portion of said arm, said lip effective to rectify the emitted liquid substantially into the bottom plane of the arm and designed to obtain a relative maximum of reactive driving power from the rectified discharging liquid with respect to the arm, along with a relative minimum of necessary hydraulic head required for operation.

NELS B. LUND.